(12) United States Patent
Maas et al.

(10) Patent No.: US 7,991,566 B2
(45) Date of Patent: Aug. 2, 2011

(54) DEVICE FOR MONITORING THE RELATIVE POSITIONS OF SEVERAL DEVICES

(75) Inventors: Hans-Juergen Maas, Woerrstadt (DE); Peter Heiland, Raunheim (DE)

(73) Assignee: Integrated Dynamics Engineering GmbH (DE)

( * ) Notice: Subject to any disclaimer, the term of this patent is extended or adjusted under 35 U.S.C. 154(b) by 414 days.

(21) Appl. No.: 12/090,779

(22) PCT Filed: May 26, 2006

(86) PCT No.: PCT/EP2006/005061
§ 371 (c)(1), (2), (4) Date: Jun. 18, 2008

(87) PCT Pub. No.: WO2007/045286
PCT Pub. Date: Apr. 26, 2007

(65) Prior Publication Data
US 2008/0255698 A1    Oct. 16, 2008

(30) Foreign Application Priority Data
Oct. 21, 2005  (DE) .............. 20 2005 016 654 U

(51) Int. Cl.
*G06F 19/00* (2011.01)
(52) U.S. Cl. ............. 702/56; 702/94; 702/150; 700/280
(58) Field of Classification Search ............... 700/280
See application file for complete search history.

(56) References Cited

U.S. PATENT DOCUMENTS

| 4,627,010 A | 12/1986 | Kosugi |
| 5,811,821 A * | 9/1998 | Alexander et al. ........ 250/440.11 |
| 5,931,441 A * | 8/1999 | Sakamoto .................... 248/550 |
| 6,597,002 B1 * | 7/2003 | Kondo ........................ 250/492.2 |
| 2003/0097205 A1 * | 5/2003 | Yuan et al. .................... 700/301 |

FOREIGN PATENT DOCUMENTS

EP    0 557 100 A    8/1993

OTHER PUBLICATIONS

"Keeping the appropriate Headway Distance Sensor Controled", Workshop 6 ACC_E.DOC, [online] Sep. 2001, XP002396671 Frankfurt, URL:http:/www.contitevesna.com/word/presskits/frankfurt/> [retrieved on Aug. 29, 2006].
PCT, "International Application No. PCT/EP2006/005061 International Preliminary Report on Patentability".

* cited by examiner

*Primary Examiner* — Drew A Dunn
*Assistant Examiner* — Hien X Vo
(74) *Attorney, Agent, or Firm* — DeMont & Breyer LLC

(57) ABSTRACT

An apparatus is presented for monitoring the relative positions and/or for measuring and evaluating relative position in a system which contains at least two sub-systems. The apparatus has several devices, of which at least one device has a vibration-isolation device. Furthermore, at least one device is provided for determining the relative positions of the devices and one evaluation device is provided for testing whether the measured relative positions of the devices lie within a tolerance interval.

13 Claims, 2 Drawing Sheets

DEVICE FOR MONITORING THE RELATIVE POSITIONS OF SEVERAL DEVICES

FIELD OF INVENTION

The invention relates to a measure for monitoring the relative positions of vibration-isolated devices and, in particular, to a device, as well as to a method for monitoring the relative positions of several devices.

BACKGROUND OF THE INVENTION

Installations, also called systems or apparatuses below, are known, which have a first vibration-isolated device, also called first sub-system below, and a second sub-system, which can have a similar vibration-isolated setup. The first sub-system can contain a lithography device, while the second sub-system has, for example, a robotic system for loading the lithography device with wafers.

An apparatus for distance measurement in a traffic area is described in the conference abstract "Keeping the appropriate Distance Sensor controlled" (URL: http://www.contitevesna-.com/word/press/Kits/Frankfurt/). This publication relates to systems for distance measurement in automobiles (Adaptive Cruise Control=ACC). In the described systems, the distance between two automobiles is measured by means of radar or infrared. If the system determines that the distance to the leading vehicle has fallen below a certain minimum distance, then the velocity of the trailing vehicle is automatically reduced until a minimum distance that can be set within certain limits is achieved again. If the street becomes clear again, then the velocity is accelerated until reaching the desired velocity.

In contrast to the invention, automobiles do not represent a part of the equipment.

A lithography device with an illumination device with a step-by-step operation is loaded by means of a robotic system (U.S. Pat. No. 4,627,010). For reducing the idle time, the relative positions of the mask and wafer is measured, a distance value representing a change in the range measurements is calculated, and the calculated value is compared with a critical value. The latter relates to the attenuation of the vibrations caused by the step-by-step movements of the illumination apparatus.

En general, the sub-systems are not directly connected to each other mechanically, but instead stand in a mutual exchange. This exchange can be, for example, a material exchange, a material transfer, or likewise the insertion of a sub-system or a component of the sub-system, for example, a robotic arm, into the other sub-system. The loading of a lithography device with wafers is also viewed as material exchange.

At least one sub-system here has a vibration-isolated setup. For example, the first sub-system is connected to a reference system via a soft spring-damper element, in order to isolate it against structure-borne vibrations. The second sub-system can also be vibration-isolated, for example, attached to the same reference system via a spring-damper element with increased stiffness. Internal/external forces and/or mass displacements acting on the vibration-isolated sub-systems in one sub-system can lead to a noticeable shift in relative positions.

To be able to guarantee error-free or ordinary operation of the installation, it is necessary to maintain the positions of both sub-systems relative to each other in a defined way with sufficient accuracy. Thus, risks should be prevented both for the sub-systems and their components and also for the exchanged material, for example, during its processing by the lithography device.

Maintaining the necessary relative positions of the sub-systems, which allows error-free operation, can be achieved with active, i.e., regulated vibration-isolated sub-systems. For this purpose, the relative positions are monitored during the operation and held within a predetermined tolerance range. This method is cost-intensive, because this measure requires complicated and thus expensive control mechanisms and maintenance work.

According to an alternative or supplemental method, the relative positions is checked once before commissioning of the installation and set to a predetermined desired value. During operation there is no monitoring and no positional control of the sub-systems. Instead, confidence is placed in the fact that the relative positions of the passively vibration-isolated sub-systems no longer changes significantly. A sub-system is passively vibration-isolated when its position is not regulated.

In such installations, relative movements of the vibration-isolated sub-systems can be limited mechanically, for example, by end stops that define the absolute movement clearance, or by time-limited coupling and/or fixing mechanisms.

The action of the movement limitation, however, can affect the sub-systems contrary to the vibration isolation and does not necessarily provide ordinary operation of the installation.

In these installations, there is no inspection of the relative position of the sub-systems during the operation for simultaneously optimized vibration isolation. That is, it cannot be determined whether the desired position of the two sub-systems is maintained relative to each other and thus whether an error-free or nearly error-free operation takes place. Error functions before and during operation, such as, for example, the transport of a wafer from one sub-system to another and the processing of the wafer by means of the lithography device, cannot be ruled out or prevented.

SUMMARY OF THE INVENTION

The present invention is thus based on the problem of avoiding the disadvantages of the known system. In particular, an apparatus and a method for monitoring the relative positions of several devices are presented which can prevent incorrect operation with simple and economical components.

A core concept is to be seen in presenting an apparatus or a device for monitoring the relative positions and/or for measuring and evaluating relative position in a system which contains at least two sub-systems, with this system also being designated below as reference displacement control (RDC). The RDC takes advantage of a suitable measurement principle in order to determine and to evaluate the relative positions of at least two devices or sub-systems, preferably continuously, and to forward the evaluated information via different interfaces.

The sub-systems can be mounted on a common reference system, for example, by means of vibration-isolation devices with different stiffness values. Through inertial forces acting within and from the outside on these sub-systems, the sub-systems can be deflected in such a way that the required positions of the sub-systems relative to each other are or can be disturbed.

Position sensors are used, whose signals are processed by means of an analog or digital measurement and/or evaluation unit. The measurement result of individual sensors and also the combination of signals of all position sensors are determined and information is derived from these signals, whether the values of individual sensors or all of the sensors are located in a parameterizable window, e.g., vertical or horizontal tolerance range. This information is provided to the RDC via a digital I/O interface and also via a visual display.

The sensors are attached in such a way that the change in position of the sub-system or the sub-systems can be measured in the degree of freedom derived by the setup.

Another interface transmits all of the information that can contain both measured and also evaluated states. The evaluated states correspond to the information provided after the testing by the evaluation device. The RDC can be read out and controlled via this interface with the help of a simple terminal and/or software.

The system is thus informed whether the relative position or relative position of both devices, also called sub-systems, to each other lie in a window or in a tolerance interval, in which an exchange of material or an insertion of a component into the other can take place, without endangering material or component(s).

The situation that the monitoring of the system is no longer guaranteed, because, for example, the RDC itself has an error function, is prevented by a heartbeat function. This function indicates the continuous data traffic between sensors and evaluation unit and can also be used via interfaces and/or the visual display. Both the heartbeat function and also the evaluation signals can be used as trigger signals for suitable countermeasures, for example, turning off the system and/or readjustment, i.e., new positioning of the sub-systems.

Using the RDC, the positions of individual stationary or moving devices or the relative positions of the devices can be determined. This allows, in particular, the monitoring of the position stability of isolation systems or vibration-isolation devices.

The setup of independent components, such as position sensors on the measurement side and firmware on the evaluation side, which can be largely freely programmed, makes the RDC adaptable and usable for many purposes for other applications in the field of position determination and position monitoring.

The task named above is achieved, first, by an apparatus for monitoring the relative positions of several devices. The apparatus has several devices, also called sub-systems, of which at least one device has a passive vibration-isolation device. Here, passive means that the vibration-isolation device is not controlled. The apparatus further includes at least one device for determining the relative positions of the devices and an evaluation device for testing whether the measured relative positions of the devices lies within a tolerance interval.

The apparatus for monitoring the relative positions is also designated below as a system. The devices whose relative positions are monitored are also designated below as sub-systems.

If several devices each have a vibration-isolation device, then these can have different stiffness values. Thus, the devices can produce different vibration responses. This is a possible cause for the result that the relative positions of the devices can fall outside of the tolerance interval. The apparatus should recognize this state, in particular.

The relative positions of the device describes the positions of the individual devices relative to each other. Here it is not absolutely necessary that the position determination device for determining the relative positions determines or measures the relative positions of the devices directly. Instead, it is also possible that the individual positions of the devices are determined or measured relative to a reference point and the relative positions of the devices is determined only in a subsequent processing step.

The subsequent processing step can be performed, for example, by an evaluation device. The reference point can be a base plate on which the devices are positioned.

In particular, the vertical and/or the horizontal relative positions of the devices are determined.

The device for determining the relative positions can have, for example, at least one sensor for determining the position. This sensor, also called position sensor below, can be, for example, a mechanical, optical, inductive, capacitive, and/or piezoelectric sensor according to requirements. As a function of the performance features of individual position sensors, the totality of all six degrees of freedom or their changes can be detected by a position sensor or by several position sensors and/or by their location of the positioning on the devices.

The tolerance interval or the tolerance range is preferably fixed by upper and lower limiting values, between which the value of the relative positions may vary.

If the value of the monitored relative positions lies outside the tolerance interval, then this can lead to damage to the devices and to incorrect operation. To prevent this situation, the relative positions may only have values within this tolerance interval.

The evaluation device includes corresponding hardware and/or software components, which check, in response to signals provided by the position determining device, whether the relative positions of the devices lie within the tolerance interval.

The passive vibration-isolation device can contain known spring and/or damping elements and also a heavy mass, which are used for the isolation of oscillations or vibrations. The parameters, such as, for example, the stiffness of the vibration-isolation device, are set before commissioning. The parameters of the passive vibration-isolation device can be set manually or electronically or can be readjusted accordingly for varying environmental conditions.

The devices can have workstations, which can contain, in turn, robotic systems or lithography devices for processing wafers.

In one of the preferred example embodiments, at least one of the devices is formed as a workstation, wherein a control device is provided which determines the operating state of the workstation as a response to the result of the evaluation device.

The workstation performs work that interacts with the other device or devices. For example, the workstation can involve a robotic system that places a wafer onto another device that can have a sample table and the lithography device, or that receives a wafer from another device.

The evaluation device tests the relative positions of the devices. If the relative position lie within the tolerance interval, then the robotic system can place the wafer on the other device. In contrast, if the relative positions of the devices change due to corresponding disruptions, in particular, impacts or vibrations, in such a way that they lie outside of the tolerance interval, then the wafer could be scratched or destroyed by the robotic system gripping at an incorrect position.

The control device includes hardware and/or software components which determine the operating state of the workstation in response to information, for example, an emergency off signal, which the evaluation device sends. The operating state can involve turning off and starting up the device. In particular, the control device can move or hold the workstation in a secure operating state-switched-off state.

After the device or devices are located in a secure operating state, the parameters of the vibration-isolation devices and/or the positions of the devices relative to each other can be reset. Then the operation can be started or resumed.

For this purpose, the control device can control the repositioning of the devices in response to the result of the evaluation device.

Furthermore, in the scope of the invention there is also a method for monitoring the relative positions of several devices, wherein at least one device has a passive vibration-isolation device. The method includes the steps: determining the relative positions of the devices, preferably by at least one device for position determination, and testing whether the measured relative positions of the devices lie within a tolerance interval.

For this purpose, preferably at least one tolerance range is defined.

According to one advantageous embodiment, however, for each device, also called sub-system, a separate tolerance range can be defined with respect to its position relative to a common reference system. In this case, the position relative of each device to the common reference system can be determined. Furthermore, with respect to each determined relative position, it is then checked whether each position relative, i.e., the corresponding device, lies within the associated tolerance range.

Alternatively, the positions of the devices can be determined relative to each other and then checked whether the determined relative positions lie within the associated tolerance range.

Each defined tolerance range can represent a two-dimensional tolerance window, which fixes the permissible horizontal and vertical positions of a device.

To be able to allow reliable position monitoring, the positions of the devices relative to the common reference system and/or the positions of the devices relative to each other are determined and evaluated at regular intervals and/or continuously.

Preferably, the invention also relates to a use of the device and/or the method in an installation or an apparatus that requires corresponding vibration-isolation devices.

BRIEF DESCRIPTION OF THE DRAWINGS

The present invention is explained in more detail below with reference to an embodiment in connection with the drawings. Shown are.

DETAILED DESCRIPTION

Figure 1A:
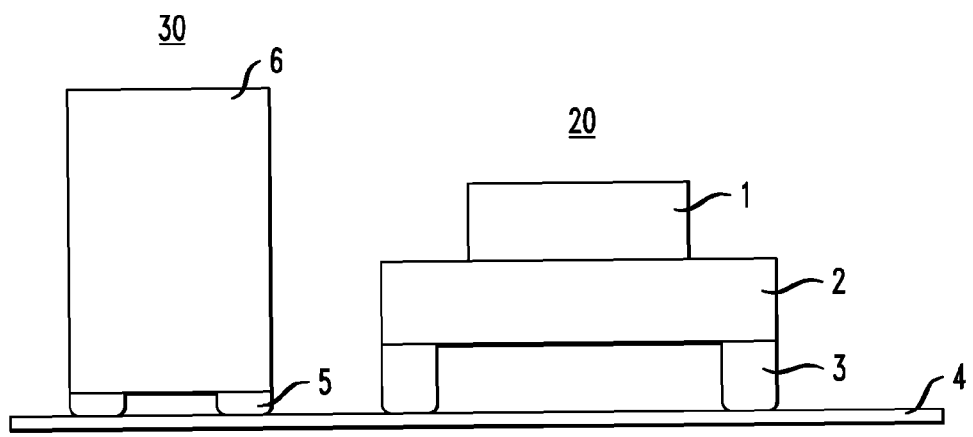
FIG. 1.*a* an example embodiment of two devices whose relative position are monitored, FIG. 1.*b* the embodiment according to FIG. 1.*a* expanded with a horizontal desired position, a vertical desired position, and a vertical tolerance range, which is defined by maximum and minimum positions, FIG. 2.*a* the block circuit diagram of an evaluation device and connected position sensors for monitoring the relative positions, and FIG. 2.*b* a simplified functional circuit diagram of the evaluation device.
Figure 1B:
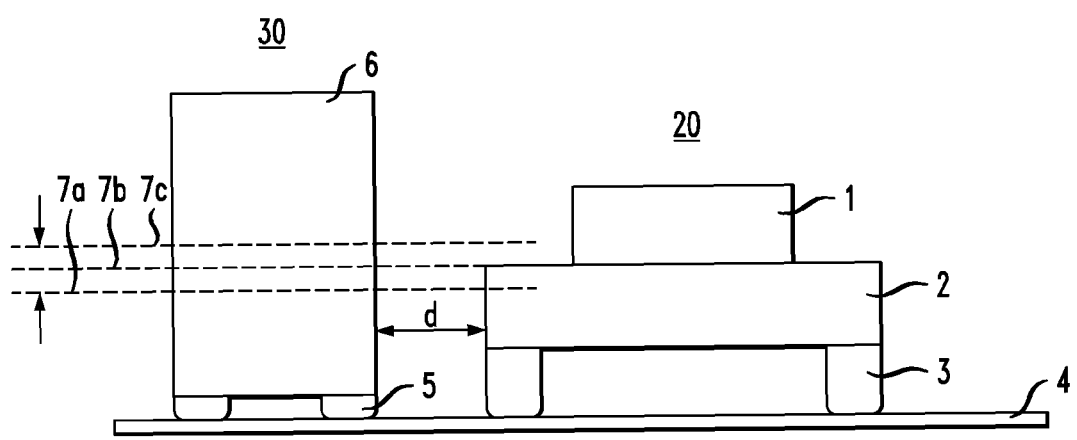
Figure 2A:
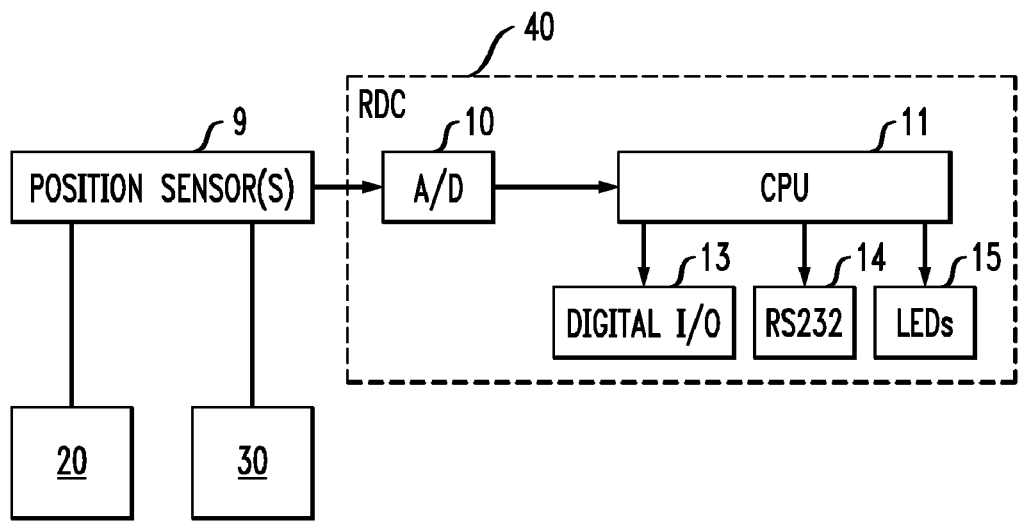
Figure 2B:
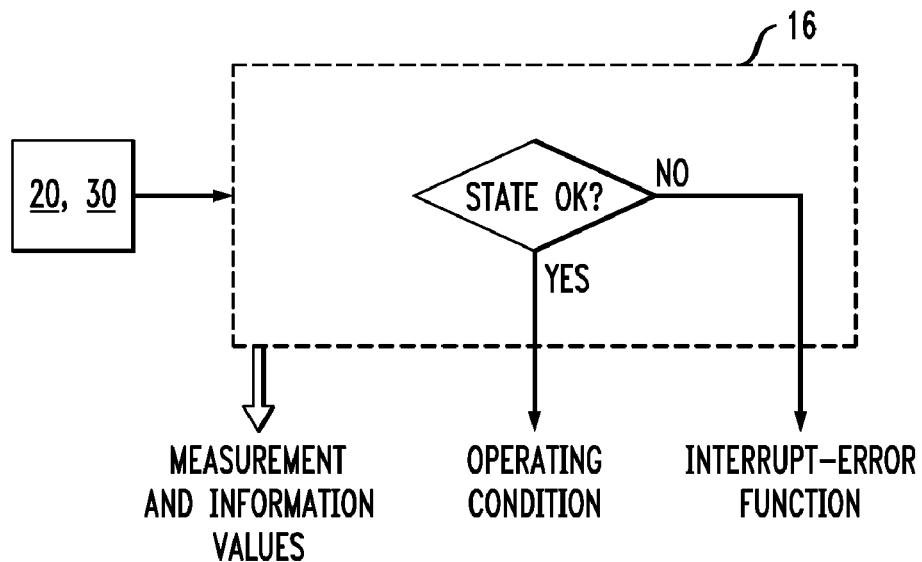

FIG. 1.*a* shows an example installation which has two devices 20 and 30, whose positions relative to each other are monitored with a circuit arrangement shown in detail in FIG. 2.*a*. The devices 20 and 30 are positioned on a base plate 4, which is used as a reference system for determining the relative positions.

The device 20 includes at least one vibration-isolation device which has, for example, four vibration isolators 3 and a mass 2 mounted on these isolators. The vibration isolators 3 can be spring-damper elements. One device 1 is arranged on the mass 2 in a vibration-isolated way. The vibration-isolated device 1 can involve, for example, a wafer holder and/or a lithography device.

The device 30 is a workstation which preferably has a functional device 6 and which is mounted, for example, on vibration isolators 5. The stiffness of the vibration isolators 3 of the device 20 can be lower than the stiffness of the vibration isolators 5 of the device 30.

In a not-shown embodiment, the workstation 30 or the functional device 6 can be positioned directly, i.e., without vibration isolators 5, on the base plate 4. The functional device 6 can be, for example, a robotic system for transporting a wafer, wherein this system can place the wafer on the sample holder or receive it from the holder.

FIG. 1.*b* shows, in turn, the installation according to FIG. 1.*a*. FIG. 1.*b* additionally shows a horizontal desired position d, a vertical desired position 7*b*, and a vertical tolerance range of the relative positions of the devices 20, 30. The vertical tolerance range is fixed by a vertical maximum position 7*c* and a vertical minimum position 7*a* measured from the base plate 4. In addition, a horizontal desired position d is shown. This can vary by a value ±Δd within a not-shown maximum horizontal position and minimum horizontal position. As described in even more detail below, the installation can be operated normally as long as the relative positions of the devices 20 and 30, which had been fixed before commissioning of the installation, lie within the horizontal and vertical tolerance ranges.

FIG. 2.*a* shows, for example, a block circuit diagram that contains an evaluation device 40 and position sensors 9, which supply measurement values to the evaluation device 40. As position sensors 9, preferably proximity sensors can be used, which measure the positions of the devices 20, 30. The position sensors 9 can be arranged on one device, on two devices, and/or on the base plate 4.

The information of the position sensors 9, here, for example, in the form of analog signals, is supplied to the evaluation device 40. The evaluation device 40 can have an analog/digital converter 10, a control device 11, which is formed, for example, as a CPU, a digital input and/or output 13, which is realized preferably as an open collector circuit, a serial interface 14, such as, for example, the RS232 interface, and/or a visual LED display 15. The LED display can have several LED elements to indicate the operating state of the installation. For example, one LED element can indicate the normal operation of the installation, while another LED element can signal the switched-off or defective state of the installation. The LED display 15 is driven by means of the CPU 11, which determines from the measurement values supplied by the position sensors 9 whether the relative positions of the devices lie within or outside of the defined tolerance ranges. The control device 11 can also cause the installation, in particular, the robotic system 6 of the device 30, to be switched off automatically when the relative positions of the devices 20 and 30 drop out of the tolerance ranges during operation.

In the shown embodiment, the analog/digital converter 10 is allocated to the evaluation device 40. In another not-shown embodiment, the analog/digital converter 10 is a stand-alone component or allocated to the position sensors 9. The analog signals of the position sensors 9 are digitized by the AD converter 10 and supplied to the control device 11.

The associated functional circuit diagram of the evaluation device 40 is shown in FIG. 2.*b*. The control device 11 tests whether each position signal is already located between a minimum position and a maximum position over a parameterizable time. If at least one of the measured position values lies outside of these limits, i.e., if it is smaller than the minimum value or greater than the maximum value, or if it does not lie within the limits at least during the defined time period, an error case is present. This error case can be made available to the outside world, for example, to an operator, as a status value, which can be queried by the evaluation device 40 via the RS232 interface 14, and/or as visual information on the display device 15. In addition, the position information can be queried continuously or at predefined time points also via the RS232 interface 14, and thus permit additional monitoring and/or diagnostic possibilities.

The evaluation device 40 or the RDC can also be configured via the RS232 interface 14 with the use of a simple terminal program. In the terminal program, for example, the following features can be configured: definition of the error conditions, linearization and calibration of the sensors, conditions for fail-safe operation, such as broken cable or processor stoppage, standard settings and starting conditions, and/or measurement accuracy and measurement frequency.

It is obvious to those skilled in the art that the embodiments described above are to be understood as examples. The invention is not limited to them, but instead can be varied in numerous ways without leaving the spirit of the invention. The features shown individually can also be combined with each other.

REFERENCE SYMBOLS

1 Vibration-isolated device
2 Supported mass
3 Vibration or oscillation isolator
4 Base plate
5 Vibration or oscillation isolator
6 Functional device
7*a* Vertical minimum position
7*b* Vertical desired position
7*c* Vertical maximum position
9 Device for determining relative positions
10 Analog/digital converter
11 CPU
12 Digital input and/or output
14 Interface for RS232 line
15 Visual LED display
20 Device
30 Workstation
40 Evaluation device
d Horizontal desired position

What is claimed is:

1. An apparatus for monitoring the relative positions of multiple devices, the apparatus comprising:
   a first device and a second device, of which at least the first device has a passive vibration-isolation device;
   a position determination device for determining relative positions of the first and second devices; and
   an evaluation device for testing whether the determined relative positions of the first and second devices in relation to each other lie within a tolerance interval;
   wherein the first and second devices are mounted on a common reference system, and wherein each of the first and second devices is capable of being at various positions in relation to the common reference system.

2. The apparatus according to claim 1, characterized in that the position determination device is designed for determining the positions of the first and second devices relative to the common reference system, and that the evaluation device is designed for determining the positions of the first and second devices relative to each other.

3. The apparatus according to claim 1, characterized in that at least one of the first and second devices is a workstation, and that a control device is provided which determines the operating state of the workstation in response to the relative positions determined by the position determination device.

4. The apparatus according to claim 3, characterized in that the control device can move the workstation into a secure operating state and/or controls repositioning of the first and second devices in response to the relative positions determined by the position determination device.

5. The apparatus according to claim 1, characterized in that the first and second devices have vibration-isolation devices with different stiffness values.

6. The apparatus according to claim 5, characterized in that each vibration-isolation device contains at least one spring-damper element.

7. The apparatus according to claim 1, characterized in that the position determination device determines the positions of the first and second devices relative to each other.

8. The apparatus according to claim 1, characterized in that the position determination device has a position sensor for determining the relative positions of the first and second devices.

9. The apparatus according to claim 8, characterized in that the position sensor is a mechanical, optical, inductive, capacitive, or piezoelectric sensor.

10. A method for monitoring the relative positions of multiple devices the method comprising:
    determining the relative positions of the devices, wherein at least one of the devices has a passive vibration-isolation device;
    fixing at least one adjustable tolerance range; and
    testing whether the relative positions of the devices in relation to each other lie within the at least one adjustable tolerance that has been fixed;
    wherein the positions of each of the devices relative to a common reference system can vary.

11. The method according to claim 10, characterized in that the determining of the relative positions of the devices is performed at regular intervals.

12. The method according to claim 11, characterized in that it is tested as to whether the determined relative positions lie within an associated tolerance range that corresponds to each of the devices, wherein the associated tolerance range is a two-dimensional tolerance window.

13. The method according to claim 10, characterized in that the determining of the relative positions of the devices is performed continuously.

* * * * *